United States Patent
Haft et al.

(10) Patent No.: US 7,149,649 B2
(45) Date of Patent: Dec. 12, 2006

(54) STATISTICAL MODELS FOR IMPROVING THE PERFORMANCE OF DATABASE OPERATIONS

(75) Inventors: Michael Haft, Zorneding (DE); Reimar Hofmann, München (DE)

(73) Assignee: Panoratio Database Images GmbH, Munich (DE)

( * ) Notice: Subject to any disclaimer, the term of this patent is extended or adjusted under 35 U.S.C. 154(b) by 211 days.

(21) Appl. No.: 10/479,991

(22) PCT Filed: May 15, 2002

(86) PCT No.: PCT/DE02/01745

§ 371 (c)(1),
(2), (4) Date: May 10, 2004

(87) PCT Pub. No.: WO02/101581

PCT Pub. Date: Dec. 19, 2002

(65) Prior Publication Data

US 2004/0186684 A1    Sep. 23, 2004

(30) Foreign Application Priority Data

Jun. 8, 2001  (DE) .............................. 101 27 914

(51) Int. Cl.
*G06F 19/00* (2006.01)
*G06F 15/00* (2006.01)

(52) U.S. Cl. ....................... 702/179; 702/181
(58) Field of Classification Search ................ 702/179, 702/181, 199
See application file for complete search history.

(56) References Cited

U.S. PATENT DOCUMENTS

2003/0013951 A1 * 1/2003 Stefanescu et al. ......... 600/407
2004/0015337 A1 * 1/2004 Thomas et al. ............... 703/11

FOREIGN PATENT DOCUMENTS

DE    195 49 300 C1    2/1997

(Continued)

OTHER PUBLICATIONS

International Search Report for PCT/DE 02/01745, Jan. 7, 2003.

(Continued)

*Primary Examiner*—Michael Nghiem
*Assistant Examiner*—Douglas N Washburn
(74) *Attorney, Agent, or Firm*—Finnegan, Henderson, Farabow, Garrett & Dunner, LLP

(57) ABSTRACT

A method for performing an automatic software-driven statistical evaluation of a large amount of data to be assigned to statistical variables in a database contained in at least one cluster. The method is characterized by using a statistical model to model an approximate description of a relative frequency of the state or states of the statistical variables and a statistical dependencies between the state or states, and then determining the approximate relative frequency of the state or states of the statistical variables and the approximate relative frequency belonging to a predetermined relative frequency of the state or states of the statistical variables and an expected value of the state or states of the statistical variables dependent thereon.

16 Claims, 3 Drawing Sheets

FOREIGN PATENT DOCUMENTS

| | | |
|---|---|---|
| DE | 197 06 767 A1 | 9/1998 |
| DE | 198 14 385 C1 | 10/1999 |
| DE | 100 37 639 A1 | 2/2001 |
| EP | 0 572 335 A2 | 12/1993 |
| JP | 2001022766 A | 1/2001 |
| WO | WO 99/62007 | 12/1999 |
| WO | WO 99/67727 | 12/1999 |
| WO | WO 00/28441 | 5/2000 |
| WO | WO 0065479 | 11/2000 |
| WO | WO 01/04818 A1 | 1/2001 |
| WO | WO 01/65421 A1 | 9/2001 |
| WO | WO 02/101581 A2 | 12/2002 |
| WO | WO 2004/017224 A2 | 2/2004 |

OTHER PUBLICATIONS

Chaudhuri et al., "An Overview of Data Warehousing and OLAP Technology," Sigmod Record, Bd. 26, Nr. 1, Mar. 1997 (pp. 65-74).

Srivastava et al., "Web usage Mining: Discovery and Applications of Usage Patterns from Web Data," ACM Sigkdd Explorations, Bd. 1, N4. 2, Jan. 2000, (pp. 12-23).

Heckerman, "A Tutorial on Learning With Bayesian Networks," Technical Report MSR-TR-95-06, XX, XX, Nov. 1996, (pp. 1-57).

Tanner, "Tools for Statistical Inference Methods for the Exploration of Posterior Distributions and Likelihood Functions," Springer, Third Edition, 1996.

"Sufficient, Complete, and Ancillary Statistics," erhältlich am Aug. 28, 2001 bei der internet-Adresse <<http://www.math.uah.edu/stat/point/point6.html>>.

Thiesson, Bo et al., "Accelerating EM for Large Databases," Technical Report MSR-TR-99-31, Microsoft Research, May 1999 (Revised Feb. 2001), erhältlich am Nov. 14, 2001 bei der Internet-Adresse: <<http://www.research.microsoft.com/~heckerman/>>.

Chickering, David M. et al., "Fast Learning From Sparse Data," erhältlich am Mar. 18, 2002, Internet-Adresse: <<http://www.research.microsoft.com/scripts/pubs/view.asp?TP ID=MSR-TR-2000-15>>.

International Search Report for PCT/DE 00/04607, Aug. 6, 2001.

Bartholomew, D.J., "Latent Variable Models and Factor Analysis," Charles Griffin & Company, Ltd., 1987.

Fundamentals for the World Wide Web, obtainable on Mar. 16, 1999 under <<http://www.w3.org>>.

Cover, Thomas W. et al., "Elements of Information Theory," Wiley, 1991.

Haft, M. et al., "Model-Independant Mean-Field Theory as a Local Method for Approximate Propagation of Information," Network: Comput. Neural Sys. 10 (1999) pp. 93-105.

* cited by examiner

FIG 1

Start Time

| State | % |
|---|---|
| early morning | 3,673 |
| morning | 14,0605 |
| noon | 18,5523 |
| afternoon | 27,5547 |
| evening | 27,3255 |
| night | 8,834 |

Session Duration

| State | % |
|---|---|
| <1 min | 46,8604 |
| <10 min | 34,6014 |
| <1 h | 17,289 |
| >1 h | 1,2493 |

No. of Requests

| State | % |
|---|---|
| 1 request | 33,7638 |
| 2 requests | 15,9414 |
| 3 requests | 10,1909 |
| 4,5 requests | 12,2356 |
| 6-10 requests | 14,009 |
| 11-20 requests | 9,0773 |
| 20 requests | 4,782 |

Referrer

| State | % |
|---|---|
| unresolved IP | 0,758 |
| ad3.endemann.de | 4,2298 |
| ad.de.doubleclick.nd | 0,0608 |
| altavista search | 2,0354 |
| other altavista categ | 0,5474 |
| de.dir.yahoo.com | 0,0561 |
|  | 0 |
| de.google.yahoo.co | 1,4645 |
| other yahoo categor | 0,1684 |
| other google catego | 3,8321 |
| fireball | 3,6543 |
| Uni Hannover meta | 2,1056 |
| lycos free search | 0,131 |
| lycos webguides (co | 0,4118 |
| lycos webguides (co | 0,1591 |
| other lycos catgego | 0,1497 |
| infoseek.../seek | 2,1009 |
| infoseek.../computer | 0,1684 |
| infoseek.../computer | 0,117 |
| infoseek.../computer | 0,0234 |
| infoseek.../catalog | 0,0281 |
| other infoseek categ | 0,0047 |
| search/suche(n) oth | 0,6785 |
| [unknown origin] | 1,764 |
| ...giga.../ | 2,2272 |
| ...chatcity.../ | 0,2948 |
| ...gamestar.../ | 0,613 |
| ...nexgo.../ | 0,7627 |
| ...siteboard.../ | 0,6504 |
| ...t-online.../ | 1,9465 |
| ...top51.../ | 0,2807 |
| Tecchannel | 1,2821 |
| spiel/games | 0,7674 |
| no referrer | 55,5166 |
| other referrer | 11,0097 |

1st Category Visited

| State | % |
|---|---|
| Christmas | 5,6616 |
| Homepage | 45,7889 |
| Operating System | 2,7747 |
| Forums | 0,0608 |
| Freeshareware | 5,7786 |
| Friends | 0,0421 |
| Hardware.html | 1,8389 |
| Hardware | 12,0859 |
| Internet.html | 0,2527 |
| Internet | 3,3361 |
| Linuxworld | 0,0094 |
| mulitmedia.html | 0,8188 |
| Multimedia | 5,568 |
| Forums | 0,0094 |
| - | 0 |
| News | 8,4877 |
| - | 0 |
| Service | 0,0234 |
| Software.html | 0,3182 |
| Software | 2,5267 |
| Tecadvocate | 0,24433 |
| Tecauction | 0,0234 |
| Tecdate | 0,03374 |
| Tecinside | 0,014 |
| Tecspecial | 0,0842 |
| Tectariff | 0,0187 |
| Tecvision | 1,516 |
| Driver.html | 0,145 |
| Uni | 0,014 |
| other pages | 2,522 |
| Session Ended | 0 |

2nd Category Visited

| State | % |
|---|---|
| Christmas | 2,522 |
| Homepage | 1,4832 |
| Operating System | 1,2914 |
| Forums | 0,2573 |
| Freeshareware | 2,1196 |
| Friends | 0 |
| Hardware.html | 7,8795 |
| Hardware | 4,534 |
| Internet.html | 1,6236 |
| Internet | 0,9264 |
| Linuxworld | 0,0094 |
| mulitmedia.html | 1,3943 |
| Multimedia | 1,254 |
| Forums | 0,0608 |
| - | 0 |
| News | 10,8787 |
| - | 0 |
| Service | 0,1404 |
| Software.html | 1,5254 |
| Software | 1,0668 |
| Tecadvocate | 0,0421 |
| Tecauction | 0,0047 |
| Tecdate | 0,0749 |
| Tecinside | 0,0936 |
| Tecspecial | 0,0328 |
| Tectariff | 0,0889 |
| Tecvision | 1,8155 |
| Driver.html | 0,3416 |
| Uni | 0,0047 |
| other pages | 1,2265 |
| Session Ended | 57,318 |

3rd Category Visited

| State | % |
|---|---|
| Christmas | 1,3242 |
| Homepage | 2,8214 |
| Operating System | 0,6831 |
| Forums | 0,1591 |
| Freeshareware | 0,8375 |
| Friends | 0,0094 |
| Hardware.html | 2,26 |
| Hardware | 8,2538 |
| Internet.html | 0,5053 |
| Internet | 1,8248 |
| Linuxworld | 0,0047 |
| mulitmedia.html | 0,613 |
| Multimedia | 1,3616 |
| Forums | 0,2527 |
| - | 0 |
| News | 1,385 |
| - | 0 |
| Service | 0,0936 |
| Software.html | 0,72520 |
| Software | 0,9966 |
| Tecadvocate | 0,0281 |
| Tecauction | 0,0094 |
| Tecdate | 0,0234 |
| Tecinside | 0,0328 |
| Tecspecial | 0,0094 |
| Tectariff | 0,0328 |
| Tecvision | 0,5194 |
| Driver.html | 0,234 |
| Uni | 0 |
| other pages | 1,2212 |
| Session Ended | 73,7788 |

4th Category Visited

| State | % |
|---|---|
| Christmas | 1,4505 |
| Homepage | 0,9686 |
| Operating Systems | 0,5942 |
| Forums | 0,131 |
| Freeshareware | 0,772 |
| Friends | 0 |
| Hardware.html | 1,5815 |
| Hardware | 2,8448 |
| Internet.html | 0,3696 |
| Internet | 0,5334 |
| Linuxworld | 0 |
| mulitmedia.html | 0,4071 |
| Multimedia | 0,6457 |
| Forums | 0,1638 |
| - | 0 |
| News | 1,6189 |
| - | 0 |
| Service | 0,117 |
| Software.html | 0,3416 |
| Software | 0,5568 |
| Tecadvocate | 0,0561 |
| Tecauction | 0 |
| Tecdate | 0,0421 |
| Tecinside | 0,0515 |
| Tecspecial | 0,0094 |
| Tectariff | 0,0608 |
| Tecvision | 0,3322 |
| Driver.html | 0,1497 |
| Uni | 0 |
| other pages | 0,8329 |
| Session Ended | 85,3687 |

STATISTICAL MODELS FOR IMPROVING THE PERFORMANCE OF DATABASE OPERATIONS

CROSS REFERENCE TO RELATED APPLICATIONS

This application is based on and hereby claims priority to PCT Application No. PCT/DE02/01745 filed on May 15, 2002 and German Application No. 10127914.0 filed on Jun. 8, 2001, the contents of which are hereby incorporated by reference.

BACKGROUND OF THE INVENTION

This invention relates to a method for the automatic, software-driven statistical evaluation of large amounts of data that is to be assigned to statistical variables in a database. The data to be evaluated can, in particular, be contained in one or several clusters.

Nowadays databases are in the position to store immense amounts of data. In order to evaluate the stored data and to be able to extract profitable information, efficient i.e. quick and specific database accesses are required because of the data occupancy.

In general, for an evaluation all the data must be found that conforms to a pre-determinable condition. Often it is not the case that the located data itself must be known, but often only information about the statistics based on the data is required.

If, for example, in a customer relationship management (CRM) system in which customer data is stored, it be determined what proportion of customers with specific features bought a certain product, a simple procedure could be to access all the customer entries in the database, request all the features of the customers and under these to find out and count those entries which "match" the desired features for which the customers bought the specific product. For example, such a request to the database could be as follows: how often were specific mobile telephones purchased by male customers who are at least 30 years old? Therefore, all the customer entries that conform to the requirements "male" and "at least 30 years old" must be found in which case a test must be performed for the matching entries found to determine which mobile telephone was purchased the most.

However, a disadvantage of this procedure is the fact that the entire database has to be read to find the matching entries. This can occasionally take a very long time in the case of very large databases.

The database can be searched more skillfully and more efficiently if all the variables are provided with selective indexes that can be requested. In this case it is a rule that the more exact and sophisticated the applicable index technique of a database is, the quicker the database can be accessed. More efficient statistical information about the database entries can also be provided accordingly. This in particular applies if the database is specifically prepared by a special index technique for the requests to be expected.

Alternatively or in combination with index techniques, the results of all the statistical requests to be expected can be pre-calculated which has the disadvantage of considerable effort required for the calculations and storage of results.

The term "online analytical processing" (OLAP) characterizes a class of methods for extracting statistical information from the data of a database. In general, such methods can be subdivided into "relational online analytical processing" (ROLAP) and "multidimensional online analytical processing" (MOLAP).

The ROLAP method only makes slight pre-calculations. When requesting the statistics, the data about the index techniques required for a response to the request is accessed and the statistics are then calculated from the data. The emphasis of ROLAP is then on a suitable organization and indexing of the data to find and load the required data as quickly as possible. Nevertheless, the effort for large amounts of data can still be very great and in addition the selected indexing is sometimes not optimum for all the requests.

In the MOLAP method the focus is on pre-calculating the results for many possible requests. As a result, the response time for a pre-calculated request remains very short. For requests that have not been pre-calculated, the pre-calculated values can sometimes also lead to an acceleration if the desired sizes can be calculated from the pre-calculated results, and this means that it is more cost-effective than directly accessing the data. The number of all possible requests increases rapidly with the increasing number of states of these variables so that the pre-calculation hits against the limits of the present possibilities with regard to memory location and turnaround time. Restrictions with regard to the variables considered, the different states of these variables or the permissible requests must then be taken into consideration.

Even though the OLAP method guarantees an increase in the efficiency compared to merely accessing each database entry it is disadvantageous that a great amount of redundant information has to be generated here. Therefore, statistics must be pre-calculated and extensive index lists created. In general, an efficient application of an OLAP method also requires that this method is optimized to specific requests in which case the OLAP method is then also subject to these selected restrictions, i.e. no random requests can be made to the database.

In addition, it is also true for the OLAP method that, the more quickly the information is to be provided and the more this information varies, the more structures must be pre-calculated and stored. Therefore, OLAP systems can become very large and are by far less efficient than would be desired, response times of less than one second can in practice not be implemented for any statistical requests to a large database. Often the response times are considerably more than one second.

Therefore, there is a need for more efficient methods for the statistical evaluation of data entries. In such cases the requests should not be subject to any restrictions if possible.

SUMMARY OF THE INVENTION

One possible object of this invention is to overcome the disadvantages of the methods known in the related art, particularly, the OLAP method for the statistical evaluation of database entries.

The inventors propose a method is shown for the automatic, software-driven statistical evaluation of large amounts of data that is to be assigned to statistical variables in a database, in particular, contained in one or more clusters which is characterized in that a statistical model for the approximate description of the relative frequencies of the states of the variables and the statistical dependencies between the states, is learnt by the data stored in the database and is used to determine, on the basis of the statistical model, the approximate relative frequencies of states of the variables, in addition to the approximate relative frequencies belonging to the pre-determinable relative frequencies of states of the variables and expected values of the states of variables dependent thereon.

Unlike the known method for statistical evaluation of the data from databases, the model is not an exact image of the statistics of the data. In general, this procedure obtains no exact, but only approximate statistical statements. However, the statistical models are subject to fewer restrictions than, for example, the known OLAP methods.

In order to make approximate, statistical statements, the entries are then "condensed" in a database to a statistical model in which case the statistical model virtually represents an approximation of the "common probabilistic distribution" of the database entries. In practice, this takes place by learning the statistical model on the basis of database entries, in which case the relative frequencies of the states of the variables of the database entries can approximately be described in this sequence. Therefore, the variables can capture many states with different, relative frequencies. As soon as such a statistical model is available, this can be used to study the relative dependencies between the states of the variables. According to a pre-determinable condition, relative frequencies of the states of the variables can be specified in this way and are used to determine the relative frequencies of states of the variables belonging to predetermined relative frequencies of states of the variables dependent thereon.

A statistical request to the database can in this way be made as a condition for the relative frequencies of specific states of the variables in which case a response to the statistical request is used to determine the relative frequencies of states of the variables belonging to predetermined relative frequencies of states of the variables dependent thereon.

As the statistical model, a graphical probabilistic model is preferably used (see e.g.: Castillo, Jose Manuel Gutierrez, Ali S. Hadi, Expert Systems and Probabilistic Network Models, Springer, New York). The graphical probabilistic models particularly include the Bayesian networks or Belief networks and Markov networks.

A statistical model can for example be generated by structured theories in Bayesian networks (see e.g.: Reimar Hofmann, Lernen der Struktur nichtlinearer Abhängigkeiten mit graphischen Modellen—learning the structure of non-linear dependencies with graphical models—, Dissertation, Berlin, or David Heckermann, a tutorial on learning Bayesian networks, Technical Report MSR-TR-95-06, Microsoft Research).

A further possibility is to learn the parameters for a fixed structure (see e.g.: Martin A. Tanner: Tools for Statistical Inference, Springer New York, 1996).

Many learning methods use the likelihood function as an optimization criterion for the parameters of the model. A particular embodiment here is the expectation maximation (EM) learning method that is explained below in detail on the basis of a special model. In principle, it mainly does not concern a generalization ability of the models, but it is only necessary to obtain a good adaptation of the models to the data.

As the statistical model, a statistical clustering model preferably a Bayesian clustering model is used by which the data is subdivided into many clusters.

Similarly, a clustering model based on a distance measurement can be used together with a statistical model by which the data is likewise subdivided into many clusters.

By using clustering models, a very large database breaks down into smaller clusters that, for their part, can be interpreted as separate databases and can be handled more efficiently based on the comparably smaller size. Here the statistical evaluation of the database tests whether or not a predetermined condition can be mapped via the statistical model to one or more clusters. Should this be applicable, the evaluated data will be restricted to one cluster or a plurality of clusters. Similarly, it is possible that such clusters are restricted to those in which the data conforming to the predetermined condition contains at least one specific relative frequency. The remaining clusters in which only a smaller amount of data is contained according to the predetermined condition can be ignored because the considered procedure only aims at approximate statements.

For example, a Bayesian clustering model (a model with a discrete latent variable) is used as a statistical clustering model.

This is described in further detail below:

Given a set of statistical variables $\{A, B, C, D, \ldots\}$, or in other words, a set of fields in a database table. The relevant lower case letters describe the states of the variables. Therefore, variable A can also accept the states $\{a_1, a_2, \ldots\}$. The states are assumed to be discrete; but in general continuous (real-value) variables are also permitted.

An entry in the database table has values for all the variables in which case the values belonging to an entry are combined into one data record D for all the variables. For example, $x_n = (a_n, b_n, c_n, d_n, \ldots)$ describes the nth data record. The table has M entries, i.e. $D = \{x_n, n=1, \ldots M\}$.

In addition, there is a hidden variable (cluster variable) that is designated with $\Omega$. The cluster variable can accept the values $\{\omega_i, i=1, \ldots, N\}$; i.e. there are N clusters.

Here, $P(\Omega|\theta)$ describes a priori distribution of the cluster in which case the a priori weight of the ith cluster is given via $P(\omega_i|\theta)$ and $\theta$ represents the parameters of the model. The a priori distribution describes which cluster of the data is assigned to the relevant clusters.

The expression $P(A, B, C, D, \ldots |\omega_i, |\theta)$ describes the structure of the ith cluster or the conditional distribution of the variables of the variable set $\{A, B, C, D, \ldots\}$ within the ith cluster.

The a priori distribution and the distributions of the conditional probabilities of each cluster thus together parameterize one common probabilistic model on $\{A, B, C, D, \ldots\} \cup \Omega$ or on $\{A, B, C, D, \ldots\}$. The probabilistic model is given by the product from the a priori distribution and the conditional distribution $$P(A,B,C,\ldots,\Omega|\Theta) = P(\Omega|\Theta) P(A,B,C,\ldots|\Omega\Theta),$$

or by $$P(A,B,C,\ldots|\Theta) = \Sigma_i P(\omega_i|\Theta) P(A,B,C,\ldots|\omega_i,\Theta).$$

The logarithmic likelihood function L of parameter $\theta$ of the data record D is now given by $$L(\Theta) = \log P(D|\Theta) = \Sigma_n \log P(x_n|\Theta).$$

Within the context of the expectation maximation (EM) theory, a sequence of parameters $\theta^{(t)}$ is now constructed according to the following general specification:

$$\Theta^{(t+1)} = \arg\max_\Theta \Sigma_n \Sigma_i P(\omega_i|x_n,\Theta^{(t)}) \log P(x_n,\omega_i|\Theta)$$

This iteration specification maximizes the likelihood function step by step.

For the conditional distributions $P(A, B, C, D, \ldots |\omega_i, \theta)$, restrictive assumptions can (and must, in general) be made. An example of such a restrictive assumption is the following factorization assumption:

If for example for the distribution of the conditional probabilities $P(A, B, C, D, \ldots \omega_i, \theta)$ of the variables of the variable set $\{A, B, C, D, \ldots\}$, the factorization $P(A, B, C, D, \ldots \omega_i, \theta) = P(A\omega_i, \theta))P(B\omega_i, \theta)P(C\omega_i, \theta))P(D\omega_i, \theta) \ldots$ is accepted, the probabilistic model conforms to a naive Bayesian network. Instead of a largely dimensional table one is now only confronted with many one-dimensional tables (tables for one variable in each case).

The parameters of the distribution can, as shown above, be learnt from the data with an expectation maximation (EM) learning method. A cluster can be assigned to each data record $x\sqcap=(a\sqcap, b\sqcap, c\sqcap, d\sqcap, \ldots)$ after the learning process. The assignment is then takes place via the a posteriori distribution $P(\Omega a\sqcap, b\sqcap, c\sqcap, d\sqcap, \ldots, \theta)$ in which case the cluster $\omega_i$ with the highest weight $P(\omega_i \sqcap\sqcap, b\sqcap, c\sqcap, d\sqcap, \ldots, \theta)$ is assigned to the data record $x\sqcap$.

The cluster affiliation of each entry in the database can be stored as an additional field in the database and corresponding indexes can be prepared to quickly access the data that belongs to a specific cluster.

If, for example, a statistical request of the type "give all the data records with $A=a_1$ and $B=b_3$ as well as the relevant distribution via C and D (i.e. $P(C \mid a_1, b_3)$ and $P(D \mid a_1, b_3)$)" is made to the database, proceed as follows:

First of all, the a posteriori distribution $P(\Omega a_1, b_3)$ is determined. From this distribution (approximate) it is clear what proportion of the data must be found in which clusters of the database according to the set condition. In this way, it is possible to restrict oneself in the case of all further processes, depending on the desired accuracy, to the clusters of the database that have a high a posteriori weight according to $P(\Omega a_1, b_3)$.

The ideal case is when $P(\Omega a_1, b_3)=1$ applies to an i and accordingly $P(\Omega a_1, b_3)=0$ for all $j \neq i$, i.e. all the data corresponding with the set condition lies in one cluster. In such a case, it is possible to restrict oneself to the ith cluster without losing accuracy in further evaluation.

In order to obtain (approximate) distributions for C and D, it is possible to either carry on using the model, i.e. approximately determine the desired distributions $P(C \mid a_1, b_3)$ and $P(D \mid a_1, b_3)$ based on the parameters of the model:

$$P(C|a_1, b_3) \cong \Sigma_i P(C|\omega_i, a_1, b_3, \Theta) P(\omega_i | a_1, b_3, \Theta).$$

However, alternatively the model can also only be used to determine the clusters that are relevant for the current request.

After restricting the request to these clusters, more exact methods can be used within the clusters. E.g. the statistics within the clusters can be counted exactly (with the help of an additional index referring to the cluster affiliation or based on the known database reporting method or the OLAP method) or further statistical models adapted to the clusters can be used. A tight interlocking with OLAP is particularly advantageous because the so-called "sparsity" of the data is utilized in large dimensions by statistical clustering models and the OLAP methods are only used effectively within the smaller dimensional clusters.

The trade-off for speed and accuracy when evaluating results from the amount of data excluded from the evaluation: the more clusters excluded from the evaluation, the quicker, but also more inexactly the response to a statistical request will be. The user himself can determine the trade-off between accuracy and speed. In addition, more exact automatic methods can be initiated if an insufficient accuracy from evaluating the model seems to be apparent.

In general, clusters that are below a specific minimum weight are excluded from the evaluation. Exact results can be obtained by excluding only such clusters from the evaluation that have an a posteriori weight of zero. Here, an exact "indexing" of the clusters can be reached as a result of an exact indexing of the database in which case the evaluation is accelerated in many cases. However, in general as many clusters as possible are used for the evaluation.

Overtraining a clustering model is of no importance, because on the contrary the aim is to produce the most exact reproduction possible of historical data and not a prognosis for the future. In the same way, intensely overtrained clustering models tend to supply a the most unambiguous possible assignment of requests to clusters, which means that in further operations it is possible to limit the request to small clusters of the database very quickly.

In an advantageous way, the data belonging to a cluster is stored on a data carrier in a way appropriate to the cluster affiliation. For example, the data belonging to one cluster can be stored on a section of the hard disk so that the data in a block belonging together can be read more quickly.

As has already been shown according to the method, known methods for the statistical evaluation of the data from databases can also be used in a supplementary way if approximate statements are deemed to be insufficient. In particular, known database reporting or OLAP methods are used to determine the relative frequencies of the states of the variables.

A supplementary application of known database techniques can for example be initiated automatically if a definable test variable accepts or exceeds a predetermined value.

A method is shown for the automatic, software-driven statistical evaluation of large amounts of data that is to be assigned to statistical variables in a database, in particular, contained in one or several clusters which is characterized in that the data is subdivided into many clusters by a clustering model based on distance measurement and, if required, the considered data is restricted to the data contained in one cluster or several clusters and in which case the database reporting methods or the OLAF methods are used to determine the relative frequencies and expected values of the states of variables.

The methods can subdivide the data of the database into clusters as well as, if required, result in a restriction to one cluster or several clusters. If the methods are used for data that is already contained in one cluster or several clusters, the clusters are in this way subdivided into subclusters. If restriction is to be to one or more subclusters, the methods for the data contained therein can be used, in which case, if required, more exactly adapted statistical models can be used. In general, this procedure can be repeated as often as desired, i.e. the clusters can be subdivided into subclusters or the subclusters into sub-subclusters as often as desired, etc. and, if required, there can be a restriction to the data contained therein in each case and the methods used (adapted more exactly) for the data contained in the considered clusters.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 shows different monitor windows in which variables for describing the visitors to a Web site are displayed.

DETAILED DESCRIPTION OF THE PREFERRED EMBODIMENT

Figure 2:
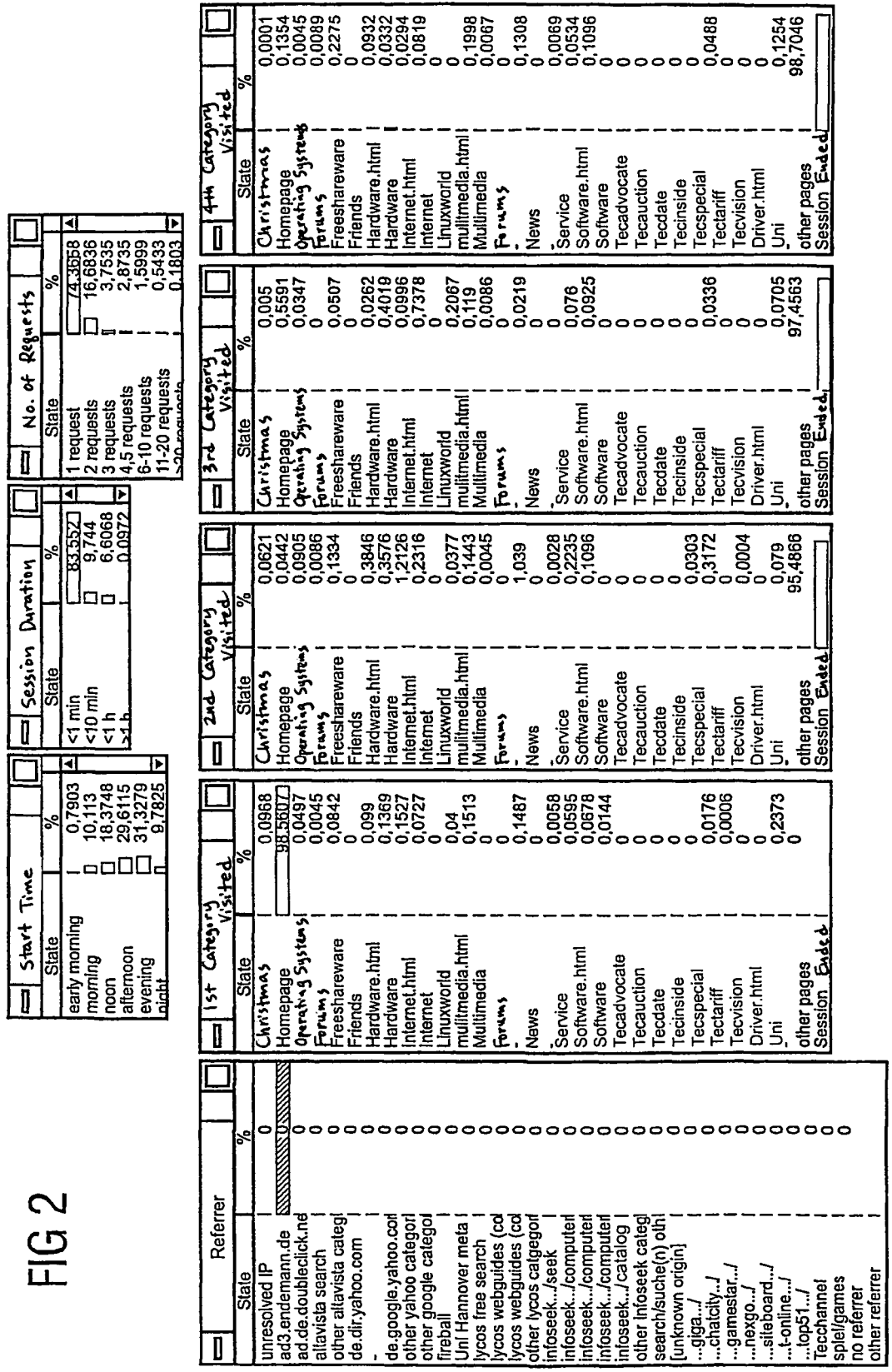
FIG. 2 shows different monitor windows of the variables of FIG. 1 in which case the behavior of visitors of a specific referrer is investigated.

Reference will now be made in detail to the preferred embodiments of the present invention, examples of which are illustrated in the accompanying drawings, wherein like reference numerals refer to like elements throughout.

In general, in the Web reporting/Web mining area large amounts of data has to be evaluated. Should a user visit a Web site, each action of the user is usually recorded in the Web log file. This is very data-intensive because such Web log files can increase very rapidly to sizes in the region of several gigabytes.

In order to prepare the evaluation of the Web log files, "sessions" or visits by visitors were extracted, i.e. all the successive entries (page retrievals or clicks) belonging to a visitor are summarized.

Each session by a visitor was characterized by a set of different variables, namely particularly "start time", "session duration", "number of requests", "referrer", "1st visited category", "2nd visited category", "3rd visited category" and "4th visited category".

In addition, further variables (not shown in the figures) were specified such as "does the visitor accept cookies", "number of sessions that the visitor had already had up to the current session", "number of pages retrieved in the last session", "interval in time to the last session", "on which page did the last session end", "time of the first session by the visitor" and "weekday".

Altogether, each session was characterized in this way on the basis of 18 different variables.

In order to determine the relative frequencies of the states of the variables, a naive Bayesian clustering model, as described above, was used.

Therefore, the specified variables were integrated in the statistical model. The statistical model was trained below by the data contained in the Web log files to find good parameters for the model. The desired relative frequencies can then be read from the model.

The result of determining the relative frequencies of the states of the variables is displayed in FIG. 1. FIG. 1 shows different monitor windows in which the variables "start time", "session duration", "number of requests", "referrer", "1st visited category", "2nd visited category", "3rd visited category" and "4th visited category" to describe the visitors to a Web site are shown.

From FIG. 1 it must particularly be identified that approximately 55% of the visitors visit the Web site during the afternoon or evening, approximately 47% of the visitors only remain less than 1 minute on the Web site, approximately 34% of the visitors only start one request, approximately 56% of the visitors do not have a referrer, approximately 45% of the visitors start on the homepage, and approximately 57% of the visitors only visit 1 category, approximately 74% of the visitors only 2 categories and approximately 85% of the visitors only 3 categories.

After the statistical model based on an EM learning method was trained, the dependencies between the variables could also be studied.

As can be seen in FIG. 2, the behavior of for example those visitors that came from a specific referrer (referred to as Endemann below) was investigated. For this, the corresponding entry in the variable "referrer" was set at 100%. By using the statistical model, it could be determined within fractions of a second that particularly approximately 99% of these visitors first visit the homepage and subsequently in the predominant majority (approximately 96%) again immediately leave the Web site.

Figure 3:
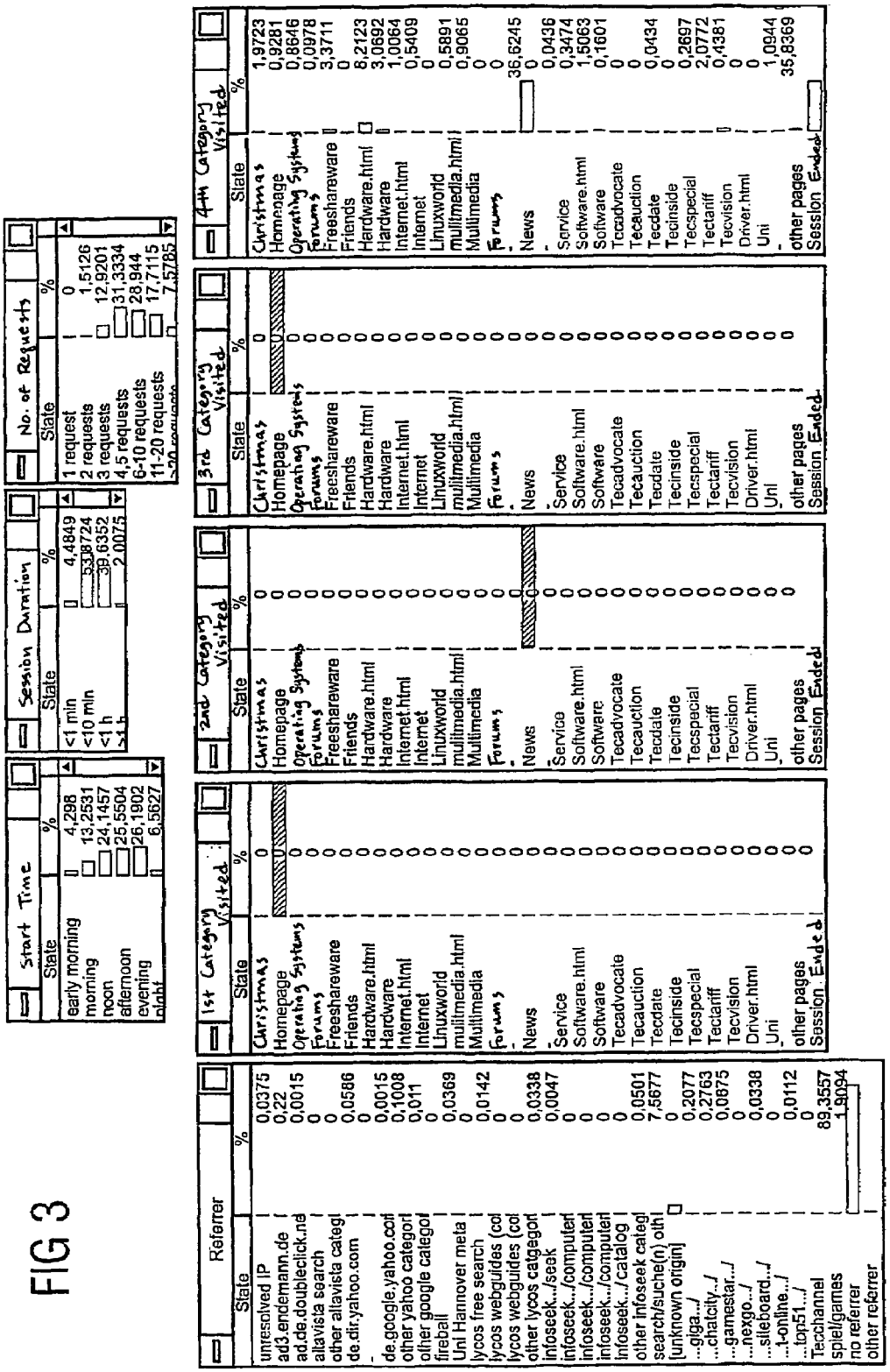
FIG. 3 shows different monitor windows of the variables of FIG. 1 in which case the behavior of visitors that call up the homepage first, then read the news and subsequently again call up the homepage is investigated.

FIG. 3 displays a complicated request to the database. FIG. 3 shows different monitor windows of the variables to be considered in which case the behavior of the visitors that call up the homepage first, then read the news and subsequently again call up the homepage is investigated. Here the corresponding entries in the variables "1st visited category", "2nd visited category" and "3rd visited category" were set at 100%.

Again, it could particularly be determined by the statistical model within fractions of a second that these visitors then predominantly either again read the news (approximately 37%) or left the Web site (approximately 36%). It can also be seen in FIG. 3 that approximately 89% of these visitors have no referrer.

In a corresponding way, a response could be given to an amplitude of further requests to the database within a short period, i.e. in general, within less than 1 second. For example, it could be tested which section of the visitors that come from a specific referrer makes more than three side requests, how these people are distributed over the time of day and which one of these visitors is a returning visitor. It could also be tested how the visitor traffic of those visitors starting with the homepage is distributed, i.e. which section of the visitors continues or subsequently aborts the session in which way.

Such an amplitude of requests with many different variables in the case of the data that simultaneously has the same size can only be handled more efficiently with the method according to one aspect of the invention compared to the known database techniques, particularly the OLAP methods. Similarly, known OLAP methods can also be used in addition to this, if exact statements are to supplement the approximate statements gained by the statistical model. However, considerably longer response times must then be taken into consideration.

To summarize, it can be established that the method described above can answer statistical requests made to extensive databases more or less by using statistical models in a more efficient way. This does not exclude that known techniques for evaluating databases can be used in a corresponding way to have exact statements, if required. By using a clustering model by which the database can be broken up into smaller clusters, it is possible to restrict oneself very quickly for requests made to the relevant clusters of a database (approximately or exactly). If clusters of the database were restricted, a recent statistical evaluation of these clusters of the database can be carried out in the course of which, if required, a renewed restriction of the subclusters contained in these clusters of the database, as well as a renewed statistical evaluation of the data contained in the subclusters can be made. In general, this procedure can be repeated as often as desired. Here it is possible to create more efficient statistics or respond to statistical requests.

Similarly, a clustering model based on a distance measurement can be used to subdivide the data of a database into many clusters in which case the relevant clusters of the database (cluster) are restricted. In order to determine the relative frequencies and expected values of the states of variables, known database reporting methods or OLAP methods are used.

In principle, the method can be used everywhere where an efficient statistical evaluation of large amounts of data is required.

Therefore, a possible application is in the Web reporting/Web mining area as has already been shown in the embodiment.

Further possible applications can for example be found there where the customer data is obtained in large amounts, such as:
data from call centers,
data from operational custom relationship management systems,
data from the health area,
data from medical databases,
data from environmental databases,
data from genome databases,
data from the financial area.

The invention has been described in detail with particular reference to preferred embodiments thereof and examples, but it will be understood that variations and modifications can be effected within the spirit and scope of the invention.

The invention claimed is:

1. A method for an automatic software-driven statistical evaluation of a large amount of data to be assigned to statistical variables in a database contained in at least one cluster, the method comprising:
developing a statistical model that approximately describes at least one relative frequency of the states of the statistical variables and a statistical dependency between the states of the statistical variables;
determining an approximate relative frequency of the states of the statistical variables and an approximate relative frequency belonging to an at least one predetermined relative frequency of the states of the statistical variables and an expected value of the states of the statistical variables dependent thereon by using data stored in the database and the statistical model;
and performing a statistical evaluation of at least one of:
(a) customer data in a Web reporting/Web mining area;
(b) customer data in a customer relationship management system;
(c) an environmental database;
(d) a medical database; and
(e) a genome database;
and outputting results of the statistical evaluation.

2. The method according to claim 1, wherein the statistical model is a graphical probabilistic model.

3. The method according to claim 1, wherein the statistical model is a Bayesian network.

4. The method according to claim 1, wherein a statistical clustering model algorithm is used to subdivide the data into a plurality of clusters.

5. The method according to claim 1, wherein a distance-based clustering algorithm is used to subdivide the data into a plurality of clusters.

6. The method according to claim 4, wherein the data considered is restricted to the data contained in at least one cluster.

7. The method according to claim 5, wherein the data considered is restricted to the data contained in at least one cluster.

8. The method according to claim 6, wherein the data belonging to the at least one cluster is restricted to specific states of statistical variables having at least one specific relative frequency.

9. The method according to claim 7, wherein the data belonging to the at least one cluster is restricted to specific states of statistical variables having at least one specific relative frequency.

10. The method according to claim 5, wherein the data belonging to the at least one cluster is stored on a data carrier respective to a cluster affiliation.

11. The method according to claim 9, wherein the data belonging to the at least one cluster is stored on a data carrier respective to a cluster affiliation.

12. The method according to claim 1, wherein a database reporting method or a OLAP method is used to determine the relative frequencies and the expected value of the states of statistical variables.

13. The method according to claim 11, wherein a database reporting method or a OLAP method is used to determine the relative frequencies and the expected value of the states of statistical variables.

14. The method according to claim 12, wherein the database reporting method or the OLAP method is used when a test variable equals or exceeds a predetermined value.

15. The method according to claim 13, wherein the database reporting method or the OLAP method is used when a test variable equals or exceeds a predetermined value.

16. A method for an automatic software-driven statistical evaluation of a large amount of data to be assigned to statistical variables in a database contained in one or several clusters comprising;
subdividing the data into many clusters by a distance-based clustering algorithm, wherein the data considered is restricted to the data contained in at least one cluster;
determining at least one relative frequency and at least one expected value of states of statistical variables by using a database reporting method or a OLAP method;
and performing a statistical evaluation of at least one of:
(a) customer data in a Web reporting/Web mining area;
(b) customer data in a customer relationship management system:
(c) an environmental database;
(d) a medical database; and
(e) a genome database;
and outputting results of the statistical evaluation.

* * * * *